(12) United States Patent
Monegan et al.

(10) Patent No.: US 10,311,443 B2
(45) Date of Patent: Jun. 4, 2019

(54) METHOD AND APPARATUS FOR MANAGING CUSTOMER INTERACTIONS ON MULTIPLE INTERACTION CHANNELS

(71) Applicant: [24]7.AI, INC., San Jose, CA (US)

(72) Inventors: Michael Monegan, Los Osos, CA (US); Tajinder Singh, Santa Clara, CA (US)

(73) Assignee: [24]7.ai, Inc., San Jose, CA (US)

( * ) Notice: Subject to any disclaimer, the term of this patent is extended or adjusted under 35 U.S.C. 154(b) by 456 days.

(21) Appl. No.: 15/186,158

(22) Filed: Jun. 17, 2016

(65) Prior Publication Data

US 2016/0371703 A1    Dec. 22, 2016

Related U.S. Application Data

(60) Provisional application No. 62/182,230, filed on Jun. 19, 2015.

(51) Int. Cl.
| | |
|---|---|
| *G06Q 30/00* | (2012.01) |
| *H04L 29/08* | (2006.01) |
| *H04L 5/00* | (2006.01) |
| *H04L 12/58* | (2006.01) |
| *H04L 12/26* | (2006.01) |

(52) U.S. Cl.
CPC ......... *G06Q 30/016* (2013.01); *H04L 67/148* (2013.01); *H04L 67/306* (2013.01); *H04L 43/0894* (2013.01); *H04L 43/16* (2013.01)

(58) Field of Classification Search
CPC combination set(s) only.
See application file for complete search history.

(56) References Cited

U.S. PATENT DOCUMENTS

| | | | | |
|---|---|---|---|---|
| 9,392,112 | B2* | 7/2016 | Vymenets | ........... H04M 3/5175 |
| 2005/0047579 | A1* | 3/2005 | Salame | ............ H04L 29/06027 |
| | | | | 379/265.09 |
| 2006/0019655 | A1 | 1/2006 | Peacock | |
| 2008/0043986 | A1 | 2/2008 | Darby et al. | |
| 2009/0210536 | A1* | 8/2009 | Allen | ...................... H04M 3/58 |
| | | | | 709/227 |
| 2010/0325216 | A1* | 12/2010 | Singh | ................. G06Q 10/0637 |
| | | | | 709/206 |
| 2013/0251136 | A1 | 9/2013 | Simoes et al. | |
| 2014/0171034 | A1 | 6/2014 | Aleksin et al. | |
| 2015/0381547 | A1* | 12/2015 | Mandanapu | ............ H04L 51/24 |
| | | | | 709/206 |

* cited by examiner

*Primary Examiner* — Mark A Fleischer
(74) *Attorney, Agent, or Firm* — Perkins Coie LLP

(57) ABSTRACT

A computer-implemented method and an apparatus facilitate management of customer interactions on multiple interaction channels. A communication quality metric and a contextual environment are tracked for an ongoing customer interaction executed on a first interaction channel. A closure of the first interaction channel is effected based on at least one of: a detected change in a current value associated with the communication quality metric to be below a preset threshold value, a detected or an anticipated change in the contextual environment, and a receipt of a customer request for closing the first interaction channel. The effecting of the closure of the first interaction channel includes a transitioning of the ongoing customer interaction from the first interaction channel to a second interaction channel.

38 Claims, 7 Drawing Sheets

METHOD AND APPARATUS FOR MANAGING CUSTOMER INTERACTIONS ON MULTIPLE INTERACTION CHANNELS

CROSS REFERENCE TO RELATED APPLICATIONS

This application claims priority to U.S. provisional patent application Ser. No. 62/182,230, filed Jun. 19, 2015, which is incorporated herein in its entirety by this reference thereto.

TECHNICAL FIELD

The invention generally relates to customer interactions with enterprises and more specifically to a method and apparatus for managing customer interactions on multiple interaction channels.

BACKGROUND

Enterprises and their customers interact with each other for a variety of purposes. For example, enterprises may engage with existing customers and potential customers to draw their attention towards a product or a service, to provide information about an event of interest, to offer incentives or discounts, to solicit feedback, to provide billing related information, and the like.

Similarly, the customers may initiate interactions with the enterprises to enquire about products/services of interest, to resolve concerns, to make payments, to lodge complaints, and the like.

Typically, an interaction between a customer and an enterprise may involve one or more interaction channels. Examples of an interaction channel may include a Web channel, a voice channel, a textual chat channel, an interactive voice response (IVR) channel, a social media channel, a native mobile application channel, and the like.

In some example scenarios, the customer may wish to transition the interaction from one device and/or interaction channel to another device and/or interaction channel and may therefore add, change or delete an interaction channel. Similarly, the enterprise may wish to transition a customer interaction to another interaction channel better suited to completing a particular transaction with the customer.

The transitioning of interaction channels, or more specifically, the addition/deletion of interaction channels must be performed smoothly and effectively in the eyes of the customer. If the transition is not seamless, the addition of an interaction channel, deletion of an interaction channel, or the transition of the interaction from one device to another can be very frustrating and can lead to customer abandoning the exchange.

SUMMARY

In an embodiment of the invention, a computer-implemented method for managing customer interactions on multiple interaction channels is disclosed. The method tracks, by a processor, a communication quality metric and a contextual environment corresponding to an ongoing customer interaction. The ongoing customer interaction is executed on a first interaction channel. The method effects, by the processor, a closure of the first interaction channel based on at least one of (1) a detection of a current value associated with the communication quality metric to be below a preset threshold value; (2) a detected or an anticipated change in the contextual environment; and (3) a receipt of a customer request for closing the first interaction channel. The effecting of the closure of the first interaction channel includes a transitioning of the ongoing customer interaction from the first interaction channel to a second interaction channel.

In another embodiment of the invention, an apparatus for managing customer interactions on multiple interaction channels includes at least one processor and a memory. The memory stores machine executable instructions therein, that when executed by the at least one processor, causes the apparatus to track a communication quality metric and a contextual environment corresponding to an ongoing customer interaction. The ongoing customer interaction is executed on a first interaction channel. The apparatus is further caused to effect a closure of the first interaction channel based on at least one of (1) a detection of a current value associated with the communication quality metric to be below a preset threshold value; (2) a detected or an anticipated change in the contextual environment; and (3) a receipt of a customer request for closing the first interaction channel. The effecting of the closure of the first interaction channel includes a transitioning of the ongoing customer interaction from the first interaction channel to a second interaction channel.

In another embodiment of the invention, a computer-implemented method for managing customer interactions on multiple interaction channels is disclosed. The method effects, by a processor, an addition of a second interaction channel to an ongoing customer interaction executed on a first interaction channel. The addition of the second interaction channel is effected to facilitate one or more predefined enterprise objectives. The method tracks, by the processor, a respective communication quality metric corresponding to each of the first interaction channel and the second interaction channel. The method further effects, by the processor, a closure of an interaction channel from among the first interaction channel and the second interaction channel based on at least one of (1) a detection of a current value associated with a communication quality metric of the interaction channel to be below a preset threshold value; (2) a detected or an anticipated lack of productivity associated with the interaction channel; and (3) a receipt of a customer request for closing the interaction channel. The effecting of the closure of interaction channel includes a transitioning of the ongoing customer interaction from the interaction channel to a remaining interaction channel from among the first interaction channel and the second interaction channel if the ongoing customer interaction is not being executed on the remaining interaction channel.

DETAILED DESCRIPTION

The detailed description provided below in connection with the appended drawings is intended as a description of the present examples and is not intended to represent the only forms in which the present example may be constructed or used. However, the same or equivalent functions and sequences may be accomplished by different examples.

Figure 1:
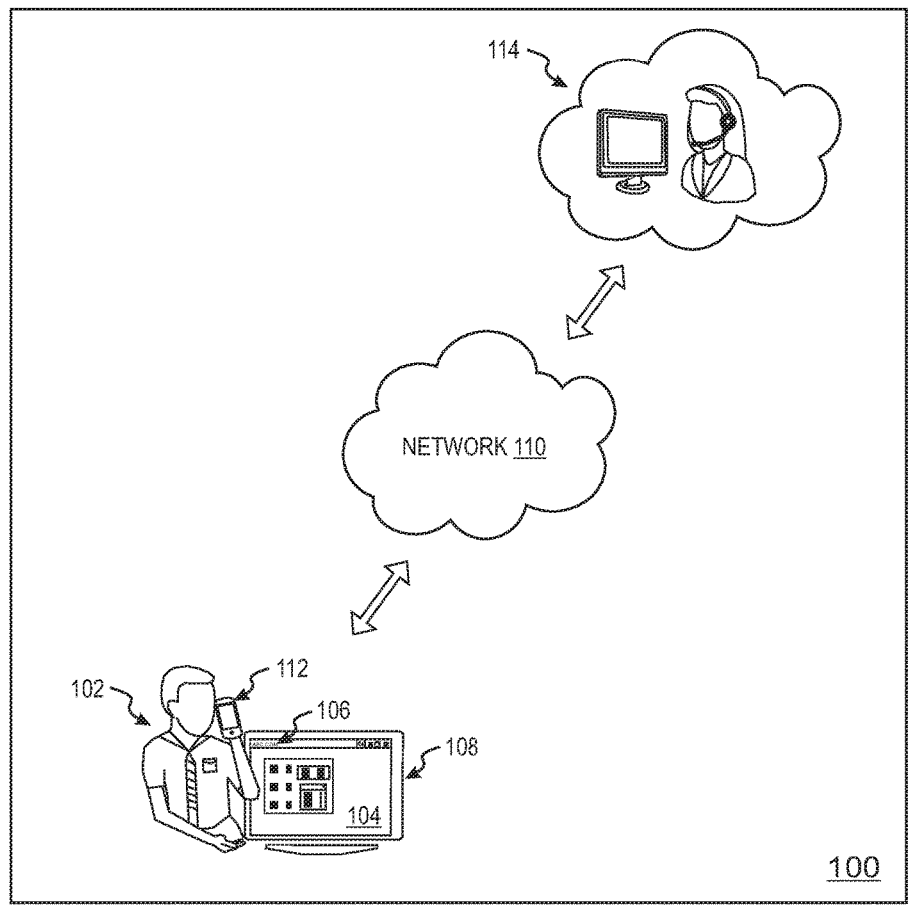
FIG. 1 is a depiction of an example interaction between a customer and an enterprise in accordance with an example scenario.

FIG. 1 is a depiction 100 of an example interaction between a customer and an enterprise in accordance with an example scenario. The depiction 100 shows a customer 102 accessing a Website 104 using a Web browser application 106 installed on a desktop computer 108. The Website 104 may be any Website offering products, services and/or information to customers, such as the customer 102. The Website 104 may be hosted on a remote Web server and the Web browser application 106 may be configured to retrieve one or more Web pages associated with the Website 104 over a network 110. Examples of the network 110 may include wired networks, wireless networks or a combination thereof. Some examples of the wired networks may include Ethernet, local area networks (LAN), fiber-optic cable networks, and the like. Some examples of the wireless networks may include cellular networks such as GSM/3G/4G/CDMA networks, wireless LANs, Bluetooth or Zigbee networks, and the like. An example of a combination of a wired network and a wireless network may include the Internet. In an example scenario, the Website 104 may attract a large number of existing and potential customers, such as the customer 102.

In an example scenario, the customer 102 may access the Website 104, i.e. use the Web channel, to learn about new products being offered for sale by an enterprise. Alternatively, in some scenarios, the customer 102 may access a native mobile application, i.e. use a native channel, on another device, such as for example a cellular phone 112, to learn about the new products being offered for sale by the enterprise. In an example scenario, the customer 102 may seek additional information for a product being displayed on the Website 104. In such a situation, the customer 102 may chat with a customer support representative, i.e. use a chat channel, or speak with a live agent such as a live agent 114, i.e. use the voice channel, to seek answers to queries that the customer 102 may have related to the product being displayed on the Website 104. In another example scenario, the customer 102 may also speak with an interactive voice response (IVR) system, i.e. use an IVR channel, to request the additional information on the product being displayed on the Website 104. The customer 102 may speak with the live agent 114 or interact with the IVR system using the cellular phone 112. Accordingly, an interaction between a customer and an enterprise may be conducted on various channels (for example, Web, chat, speech, IVR, and the like) and may involve one or more communication devices (for example, a desktop computer, a cellular phone, a tablet device, a smartphone, and the like).

In an example scenario, additional interaction channels may be added to an on-going interaction between the customer 102 and an enterprise to enrich the interaction or to better serve the customer 102. For example, the enterprise can send a chat invitation, a Web link, or an email, or auto-detect channel presence of the customer 102 on the Web channel and open a pop-up window on the Website 104 to facilitate addition of a chat interaction channel.

In some example scenarios, the customer 102 may wish to transition the current interaction from one device and/or interaction channel to another device and/or interaction channel and may therefore add, change or delete an interaction channel. Similarly, the enterprise may wish to transition the customer interaction to another interaction channel better suited to completing a transaction with the customer 102.

In all such interaction scenarios, the transitioning of interaction channels, or more specifically, the addition/deletion of interaction channels must be performed smoothly and effectively in the eyes of the customer 102. If the transition is not seamless for the customer 102, the addition of an interaction channel, deletion of an interaction channel, or the transitioning of the interaction from one device to another can be very frustrating and can lead to customer 102 abandoning the exchange.

Further, particular circumstances of a customer and the current interaction may have to be taken into account while facilitating transition of an interaction from one interaction channel/device to another. For example, a suggestion by an agent to add a voice channel for assistance may not be acceptable to a customer for various reasons, such as for example, the customer is in a noisy environment, is using a device without voice capabilities, does not have her or his telephone handy, can not use the touch screen on a mobile device while driving, or any such reason. While this suggestion may in general seem appropriate, it can be inappropriate to the current interaction and can cause the customer to reject the suggestion.

Various embodiments of the invention provide a method and an apparatus that are capable of facilitating seamless transition of customer interactions over multiple interaction channels and devices while taking into account particular circumstances of the customers and their interactions. An example apparatus for managing customer interactions on multiple interaction channels is explained with reference to FIG. 2.

Figure 2:
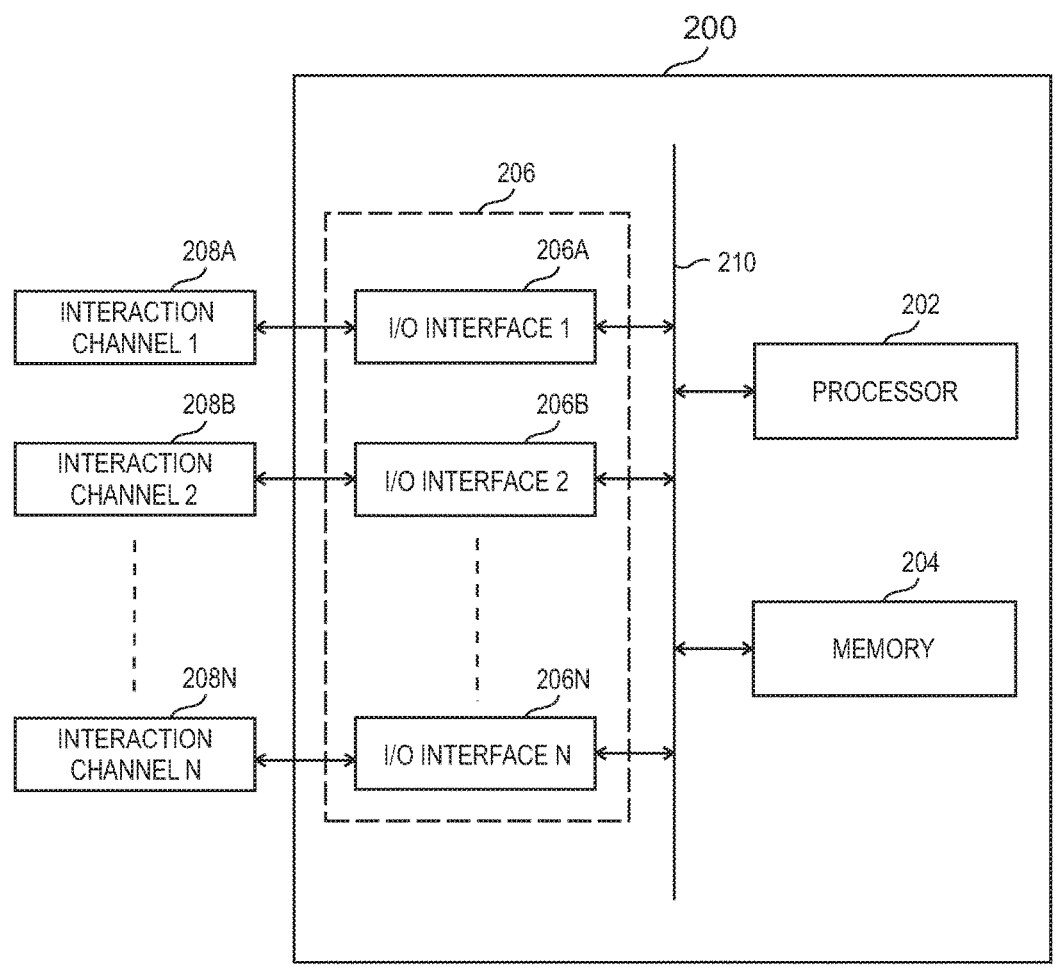
FIG. 2 is a block diagram of an apparatus configured to manage customer interactions on multiple interaction channels, in accordance with an embodiment of the invention.

FIG. 2 is a block diagram of an apparatus 200 configured to manage customer interactions on multiple interaction channels, in accordance with an embodiment of the invention. The term 'customer' as used herein refers to either an existing user or a potential user of products, services and/or information offered by an enterprise. Moreover, the term 'customer' of the enterprise may refer to an individual, a group of individuals, other organizational entity etc. The term 'enterprise' may refer to a corporation, an institution, a small/medium sized company or even a brick and mortar entity. For example, the enterprise may be a banking enterprise, an educational institution, a financial trading enterprise, an aviation company, a consumer goods enterprise or any such public or private sector enterprise. Moreover, the term 'interaction' or 'customer interaction' as used interchangeably herein refers to any communication and/or exchange between a customer and an enterprise related entity, such as for example an enterprise Website, a customer support representative of the enterprise and the like. For example, a customer activity of browsing through Web pages of an enterprise Website may be considered as an interaction between the customer and the enterprise for purposes of the description. In another illustrative example, a customer activity of engaging in a voice call interaction or a chat interaction with a human agent associated with the enterprise may be considered as an interaction between the customer and the enterprise. In yet another illustrative example, the activity of using enterprise self-help tools, such as for example an IVR system, by the customer may also be considered as an interaction between the customer and the enterprise. Accordingly, any such form of communication or exchange between a customer and an enterprise related entity is referred to herein as the customer interaction.

The apparatus 200 includes at least one processor, such as a processor 202 and a memory 204. It is noted that although the apparatus 200 is depicted to include only one processor, the apparatus 200 may include more number of processors therein. In an embodiment, the memory 204 is capable of storing machine executable instructions. Further, the processor 202 is capable of executing the stored machine executable instructions. In an embodiment, the processor 202 may be embodied as a multi-core processor, a single core processor, or a combination of one or more multi-core processors and one or more single core processors. For example, the processor 202 may be embodied as one or more of various processing devices, such as a coprocessor, a microprocessor, a controller, a digital signal processor (DSP), a processing circuitry with or without an accompanying DSP, or various other processing devices including integrated circuits such as, for example, an application specific integrated circuit (ASIC), a field programmable gate array (FPGA), a microcontroller unit (MCU), a hardware accelerator, a special-purpose computer chip, or the like. In an embodiment, the processor 202 may be configured to execute hard-coded functionality. In an embodiment, the processor 202 is embodied as an executor of software instructions, wherein the instructions may specifically configure the processor 202 to perform the algorithms and/or operations described herein when the instructions are executed.

The memory 204 may be embodied as one or more volatile memory devices, one or more non-volatile memory devices, and/or a combination of one or more volatile memory devices and non-volatile memory devices. For example, the memory 204 may be embodied as magnetic storage devices (such as hard disk drives, floppy disks, magnetic tapes, etc.), optical magnetic storage devices (e.g. magneto-optical disks), CD-ROM (compact disc read only memory), CD-R (compact disc recordable), CD-R/W (compact disc rewritable), DVD (Digital Versatile Disc), BD (Blu-ray® Disc), and semiconductor memories (such as mask ROM, PROM (programmable ROM), EPROM (erasable PROM), flash ROM, RAM (random access memory), etc.).

The apparatus 200 also includes a plurality of input/output (I/O) interfaces such as I/O interface 1, 2 to N (also depicted in FIG. 2 as I/O interface 206a, 206b to 206n, respectively). The I/O interfaces 206a to 206n are hereinafter collectively referred to as I/O interfaces 206 and individually as I/O interface 206. In an embodiment, the I/O interfaces 206 are communicably associated with a plurality of interaction channels, such as interaction channels 1, 2 to N (also depicted in FIG. 2 as interaction channel 208a, 208b to 208n, respectively). The interaction channels 208a to 208n are hereinafter collectively referred to as interaction channels and individually as an interaction channel. The I/O interfaces 206 are configured to receive up-to-date information related to the interactions between the customers and the enterprise entities from the interaction channels. In some example embodiments, the interaction channels may also be associated with data gathering servers (not shown in FIG. 2), which are configured to collate personal data of the customers such as customer profile information including customer name, mailing address, contact information such as a mobile phone number and/or an email address, login ID, IP address and the like. Moreover, such data may be collated from the plurality of interaction channels and/or a plurality of devices used by the customers. To that effect, the data gathering servers may be in operative communication with various customer touch points, such as electronic devices associated with the customers (such as the desktop computer 108 and/or the cellular phone 112 associated with the customer 102 in FIG. 1), Websites visited by the customers, customer support representatives (for example, voice agents, chat agents, IVR systems, in-store agents, and the like) engaged by the customers and the like. In an embodiment, the I/O interfaces 206 are configured to receive customer-related data from the interaction channels and/or the data gathering servers and store the customer-related data in the memory 204.

In an embodiment, various components of the apparatus 200, such as the processor 202, the memory 204 and the I/O interfaces 206 are configured to communicate with each other via or through a centralized circuit system 210. The centralized circuit system 210 may be various devices configured to, among other things, provide or enable communication between the components (202-206) of the apparatus 200. In certain embodiments, the centralized circuit system 210 may be a central printed circuit board (PCB) such as a motherboard, a main board, a system board, or a logic board. The centralized circuit system 210 may also, or alternatively, include other printed circuit assemblies (PCAs) or communication channel media.

It is understood that the apparatus 200 as illustrated and hereinafter described is merely illustrative of a system that could benefit from embodiments of the invention and, therefore, should not be taken to limit the scope of the invention. It is noted that the apparatus 200 may include fewer or more components than those depicted in FIG. 2. In an embodiment, the apparatus 200 may be implemented as a platform including a mix of existing open systems, proprietary systems and third party systems. In another embodiment, the apparatus 200 may be implemented completely as a platform including a set of software layers on top of existing hardware systems. In an embodiment, one or more components of the apparatus 200 may be deployed in a Web server. In another embodiment, the apparatus 200 may be a standalone component in a remote machine connected to a communication network (such as the network 110 explained with reference to FIG. 1) and capable of executing a set of instructions (sequential and/or otherwise) so as to effect managing of customer interactions on multiple interaction channels. Moreover, the apparatus 200 may be implemented as a centralized system, or, alternatively, the various components of the apparatus 200 may be deployed in a distributed manner while being operatively coupled to each other. In an embodiment, one or more functionalities of the apparatus 200 may also be embodied as a client within devices, such as customers' devices. In another embodiment, the apparatus 200 may be a central system that is shared by or accessible to each of such devices.

In at least one example embodiment, the processor 202 is configured to, with the content of the memory 204, cause the apparatus 200 to track a plurality of interaction channels in real-time for detecting interaction requests made by customers to the enterprises. However, it is noted that in some example scenarios, the request for interaction may be initiated by the enterprise and accordingly the apparatus 200 may be caused to detect such requests for interactions from enterprises to customers as well. As explained with reference to FIG. 1, the customers and the enterprises may engage in interactions for a wide range of purposes. In an embodiment, the apparatus 200 may further be caused to detect the provisioning of access to an interaction channel for facilitating the interaction between the customer and the enterprise. In an illustrative example, a customer may key-in a Website URL corresponding to a Website associated with an enterprise in a Web browser, thereby seeking access to the Website. The apparatus 200 may be caused to detect such request for access/interaction from the customer and further detect the provisioning of one or more Web pages to the customer, thereby signaling an initiation of interaction between the customer and the enterprise over the Web channel. In another illustrative example, a customer may place an outbound call to a customer care center to speak with a customer support representative (also referred to herein as an 'agent'). The apparatus 200 may be caused to detect the request for interaction over a voice channel and further detect initiation of the interaction upon the agent responding to the customer's outbound call. It is noted that though the apparatus 200 is described herein to detect the request for interaction from a customer to an enterprise (or from an enterprise to a customer) and further detect the initiation of the interaction, in some example embodiments, the apparatus 200 may be caused to receive request for interactions from the customers/enterprises and further facilitate interaction between the customers and the enterprises. To that effect, the I/O interfaces 206 of the apparatus 200 may be in operative communication with device application programming interfaces (APIs) capable of pushing content, such as Web-links, SMS notifications etc., and/or UIs such as chat console UIs on customer devices for facilitating respective interactions between the customers and the agents of the enterprise. The managing of customer interactions on multiple interaction channels by the apparatus 200 is explained hereinafter with reference to one customer interaction. It is noted that the apparatus 200 is configured to manage customer interactions for several other customers of the enterprise in a similar manner.

In at least one example embodiment, the processor 202 is configured to, with the content of the memory 204, cause the apparatus 200 to track a communication quality metric and a contextual environment corresponding to an ongoing customer interaction. In an illustrative example, the ongoing customer interaction corresponds to an interaction between a customer of an enterprise and a customer support representative associated with the enterprise, such as for example a human agent, a virtual agent, an interactive voice response (IVR) system, and the like. In another illustrative example, the ongoing customer interaction corresponds to an interaction between a customer of an enterprise and a Website or a native mobile application associated with the enterprise.

In an embodiment, the ongoing customer interaction is executed on a first interaction channel. Some non-limiting examples of the first interaction channel may include a Web channel, a textual chat channel, a voice channel, an interactive voice response (IVR) channel, a social media channel, a native mobile application channel, an email channel, and the like.

In an embodiment, the communication quality metric is a measure indicative of a quality of communication afforded to the ongoing customer interaction by the first interaction channel. The apparatus 200 is caused to track at least one of an audio quality, a video quality and a speed of interaction associated with the first interaction channel. For example, if the ongoing customer interaction corresponds to a customer interaction with a Website, or more specifically, the first interaction channel is a Web channel, then the apparatus 200 may be caused to determine a speed of Web interaction and thereafter track a speed of accessing Web pages, uploading of content such as image content within the Web pages, a resolution quality of video content on the Web pages, etc. In another illustrative example, if the ongoing customer interaction corresponds to a voice interaction with an agent, then an audio quality may be determined and thereafter tracked by the apparatus 200 by monitoring for example signal/channel properties such as fidelity, noise, clarity, and the like. In some example embodiments, the apparatus 200 may also be caused to define communication quality metric as a measure of effort, efficiency, completeness, benefit, net promoter score (NPS), customer satisfaction (CSAT) score, cost and/or effectiveness vis-à-vis the ongoing customer interaction.

In at least one example embodiment, the apparatus 200 may be caused to determine a current value of the communication quality metric and thereafter track the current value of the communication quality metric. In at least some example embodiments, the actual measurements of audio quality (in decibels or signal-to-noise ratio measurements), of video quality (in Peak-Signal-to-Noise-Ratio or PSNR measurement or in terms of resolution, such as high definition resolution, etc.) or of speed of interaction (in megabytes per second) may be translated into values on a scale of 1 to 10 based on the pre-defined ranges the measurements fall into. For example, if the video quality is determined to be of ultra high definition (UHD) range then a current value of '10' implying excellent communication quality may be determined. Similarly, for a high definition video quality, a current value of '5' implying an average communication quality may be determined, whereas for a non-HD or a low-resolution video quality, a current value of '1' implying poor communication quality may be determined. In another illustrative example, if the customer's speech input cannot be heard and recognized by a speech recognition-based IVR system, then the communication quality may be determined to be 'Extremely Poor' and the current value of the communication quality metric may assume a value of '1'. In another illustrative example, if there is minimum delay (for example, 2 seconds or less) for loading of a Web page during an ongoing Web interaction of a customer, then the communication quality may be determined to be 'Excellent' and the current value of the communication quality metric may assume a value of '10'. However, if the delay for loading of a Web page is 10 seconds or more then the communication quality may be determined to be 'poor' and the current value of the communication quality metric may assume a value of '4' or less.

It is noted that a current value of the communication quality metric may change or vary during the course of the ongoing customer interaction. For example, in some scenarios, the customer may change location during the course of the ongoing interaction and as a result the current value of the communication quality metric may change due to reasons, such as no network connectivity or noisy environment at the current location and the like. Accordingly, the apparatus 200 may be caused to track the current value of the communication quality metric throughout the duration of the customer interaction.

In addition to tracking the communication quality metric, the apparatus 200 may be caused to track the contextual environment associated with the ongoing customer interaction. In at least some example embodiments, tracking the contextual environment involves monitoring at least one of a location of a customer associated with the ongoing customer interaction, ambient conditions associated with the location of the customer, a time of the day and a speed of movement associated with the customer. For example, the apparatus 200 may be caused to determine a location of the customer at the time of initiation of the interaction and thereafter monitor if there is change in the location during the course of the ongoing interaction. In an illustrative scenario, a customer may have initiated a voice call interaction with an agent from a location identified to be a home environment for the customer based on the collated customer-related data. The customer may move away from the home environment during the course of the voice call interaction. The apparatus 200 may be caused to detect such a change in location of the customer. In an example embodiment, based on the rate of change in location, the apparatus 200 may be caused to deduce that the customer is travelling in a vehicle and anticipate a change in location based on the speed and direction of travel. In another illustrative example, the customer may have initiated a chat interaction with an agent and may continue the interaction till a time generally associated with the customer leaving an office environment. The apparatus 200 may be caused to track time of the interaction and detect and/or anticipate such a change in contextual environment of the customer.

In at least one example embodiment, the processor 202 is configured to, with the content of the memory 204, cause the apparatus 200 to effect a closure of the first interaction channel based on at least one of: (1) a detection of the current value associated with the communication quality metric to be below a preset threshold value; (2) a detected or an anticipated change in the contextual environment; and (3) a receipt of a customer request for closing the first interaction channel. The closure of an interaction channel (for example, the first interaction channel), also referred to as 'channel deletion' herein may be performed to improve the interaction with the customer thereby eliminating the interaction channel that is no longer contributing positively to the interaction between the customer and the enterprise or that is no longer assisting in converting the customer (for example, converting the customer from an visitor/information seeker to a purchasing entity).

In an illustrative example, the apparatus 200 may be caused to detect that the current value of communication quality metric for the ongoing customer interaction is below a preset threshold value, such as for example a value of '5', which implies an average quality of communication. In such a scenario, the apparatus 200 may be caused to determine that the first interaction channel is no longer effective for enabling the ongoing customer interaction. In another illustrative scenario, the apparatus 200 may determine that the customer has moved to a location or an environment (for example, noisy environment) that is not conducive to use of the first interaction channel. In such a scenario, the apparatus 200 may be caused to determine that the first interaction channel is no longer effective for enabling the ongoing customer interaction.

In some scenarios, the customer may explicitly express a desire to change the current interaction channel (i.e. the first interaction channel). For example, the customer may wish to transition the current chat interaction from a laptop computer to a voice interaction on a mobile phone as a battery power of the laptop computer is about to be drained completely. In such a scenario, the customer may explicitly request to close the chat interaction on the laptop computer. In another example scenario, the customer may wish to transition a Web interaction to an IVR interaction, as the customer is about to board a vehicle and may therefore request to close the Web interaction. Accordingly, for reasons such as deterioration in communication quality metric or change in contextual environment or customer request for change in interaction channel, the apparatus 200 may be caused to effect a closure of the first interaction channel.

In at least one example embodiment, an effecting of the closure of the first interaction channel includes a transitioning of the ongoing customer interaction from the first interaction channel to a second interaction channel. In an embodiment, the second interaction channel corresponds to a different interaction channel than the first interaction channel. For example, the first interaction channel may correspond to a Web channel and the second interaction channel may correspond to a native mobile application channel. However, it is noted that in some embodiments, the second interaction channel may correspond to another instance of same interaction channel on a different device from a device currently being used for facilitating the ongoing customer interaction by the first interaction channel. For example, the first interaction channel may be a Web channel being accessed on a desktop computer, whereas the second interaction channel may be a Web channel being accessed on a mobile phone. In an embodiment, the transitioning of the ongoing customer interaction to the second interaction channel is effected on a same device facilitating the ongoing customer interaction using the first interaction channel. For example the first interaction channel may be a chat channel being executed on a mobile phone. The interaction may then be transitioned to a voice interaction on the same mobile phone. The transitioning of the ongoing customer interaction to the second interaction channel may also be effected on a different device than the device used for executing the ongoing customer interaction on the first interaction channel. The closure of an interaction channel is further explained with reference to a following illustrative example.

In an example scenario, a customer begins an interaction with the enterprise on a cellular carrier to learn about new devices and usage plans. Because the customer is at work, the customer initiates the interaction using a laptop computer. The interaction continues with the enterprise reciting pertinent information, presenting Web pages, offering chat, presenting relevant URLs, completing actions, changing state, and so on. The hour grows late so the customer plans to leave the office. Based on the information previously collected for the customer and current information, such as current GPS location, current motion/travel, the enterprise, using the apparatus 200, may learn of other devices available to the customer, the typical length of the customer's commute, favorite modes of transportation, etc. The enterprise may deduce the customer's location and motion/travel/changes-in-location, based on cell phone data, Wi-Fi triangulation, GPS, and so on. The enterprise, using the apparatus 200, may then predict that the present channel is no longer as effective or valid and transition the interaction channel from the customer's laptop computer to the customer's smartphone or tablet device.

In an embodiment, the ongoing customer interaction is transitioned to the second interaction channel prior to the closure of the first interaction channel. More specifically, the apparatus 200 may be caused to delete the first interaction channel after the addition of the second interaction channel to the ongoing customer interaction. Such a transition is also referred to herein as a 'Warm' transition. More specifically, the second interaction channel is added to the interaction while the first interaction channel is still active. Various levels of channel transition warmth range from 'Luke Warm', where an interaction channel is proactively closed quickly, to 'Medium Warm', in which a transition passively gives the customer some time to stop an impending closure, to a 'Fully Warm' transition that explicitly asks for permission to close the first interaction channel before channel deletion is initiated. In all of these cases, the ongoing customer interaction switches to the second interaction channel making both channels active for a time and then the first interaction channel is deleted. In an illustrative example, a customer (using a smartphone) may interact with an agent on a voice channel and subsequently a chat channel (on the customer's additional device such as a tablet device or on the smartphone itself) may be added to the interaction. The voice channel on the smartphone may thereafter be deleted after adding the chat channel.

In an embodiment, the transitioning of the ongoing customer interaction to the second interaction channel and the closure of the first interaction channel are effected substantially simultaneously. More specifically, the apparatus 200 may be caused to delete the first interaction channel while simultaneously or synchronously adding the second interaction channel to the ongoing customer interaction. Such a transition is also referred to herein as a 'Hot' transition. In an illustrative example, a customer (using a smartphone) may interact with an agent on a voice channel and as the interaction progresses a chat channel may be added (on the customer's additional device such as a tablet device or on the smartphone itself) to the interaction while deleting the voice channel substantially simultaneously.

In an embodiment, the transitioning of the ongoing customer interaction to the second interaction channel is effected subsequent to the closing of the first interaction channel. More specifically, the apparatus 200 may be caused to delete the first interaction channel and then add the second interaction channel to the ongoing customer interaction. Such a transition is also referred to herein as a 'Cold' transition. More specifically, a 'Cold' transition occurs when the first interaction channel is deleted before the second interaction channel is added but with transition guidance prompt (either in speech/on-screen or both as per interaction situation). For example, a customer (using a smartphone) may interact with an agent on a voice channel and subsequently the voice channel may be deleted from the interaction and a chat channel may be added to the interaction (on the customer's additional device such as a tablet device or on the smartphone itself) after the deletion of the voice channel.

The transitioning of interaction channels as a customer-to-enterprise interaction progresses is further explained with reference to FIG. 3.

Figure 3:
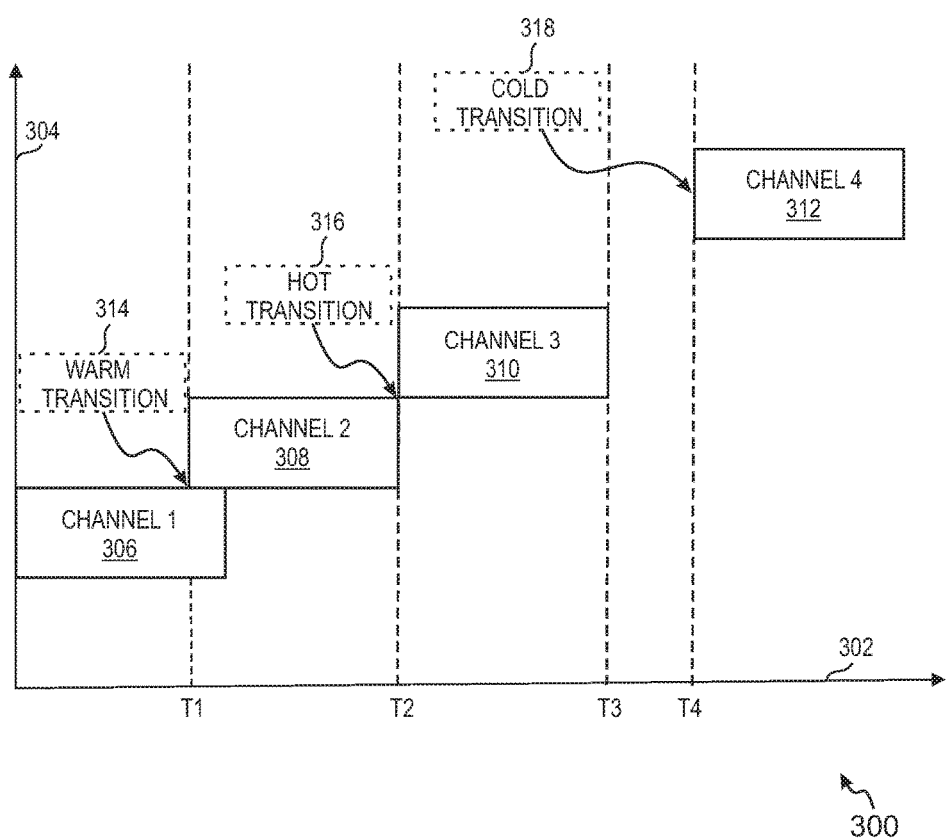
FIG. 3 shows an example interaction time-line diagram for illustrating addition and deletion of interaction channels as an interaction between a customer and an agent progresses, in accordance with an embodiment of the invention.

FIG. 3 shows an example interaction time-line diagram 300 for illustrating addition and deletion of interaction channels as an interaction between a customer and an agent progresses, in accordance with an embodiment of the invention. The interaction time-line diagram 300 corresponds to a graphical representation with an X-axis 302 representing a time-line for various instances of time and a Y-axis 304 representing a plurality of interaction channels, such as for example, the voice channel, the chat channel, the IVR channel, the Web channel, the native mobile application channel and the like. The various interaction channels are herein represented as channels 306, 308, 310 and 312, which are referred to hereinafter as channel 1, channel 2, channel 3 and channel 4, respectively. A first interaction channel, i.e. channel 1, is accessed for facilitating an interaction between a customer and an enterprise at the $0^{th}$ time instant (for example, initial time instant). At time instant T1, channel 1 remains open and a second interaction channel, i.e. channel 2 is opened. As depicted in the interaction time-line diagram 300, the channel 1 remains open for a time period after the opening of channel 2 and is then closed, leaving channel 2 open. The channel 1 (or subsequently added channels) may be closed or deleted based on a various criteria such as deteriorating communication quality metric, change in contextual environment, explicit customer request etc. as explained with reference to FIG. 2 and is not explained herein. Further, as explained with reference to FIG. 2, such a transition of interaction with opening and closing of interaction channels with some overlap is referred to as 'Warm' transition (as depicted exemplarily by block 314). At time instant T2, the channel 2 is closed and a third interaction channel, channel 3 is opened. As explained with reference to FIG. 2, such a transition of interaction with synchronous opening and closing of interaction channels is referred to as 'Hot' transition (as depicted exemplarily by block 316). At time instant T3, channel 3 is closed and at a later point in time, i.e. at time instant T4, channel 4 is opened. It is noted that the time difference between time instant T3 and T4 may correspond to any time duration. As explained with reference to FIG. 2, such a non-synchronous transition of interaction with opening and closing of interaction channels with no overlap is referred to as 'Cold' transition (as depicted exemplarily by block 318).

Referring now to FIG. 2, in an embodiment, the apparatus 200 may be caused to provide a closure/deletion experience to the customer while deleting an interaction channel, such as the first interaction channel or any of the subsequently added channels. The closure/deletion experience may be associated with one or more of steps, treatments, interactive prompts, visuals, notifications, interaction flow and the like, for managing and preparing the customer while closing the interaction channel.

In an embodiment, the apparatus 200 may be caused to generate one or more recommendations in relation to the provisioning of the closure/deletion experience. In an embodiment, the apparatus 200 may be caused to provision a recommendation to the customer to close the first interaction channel. In an embodiment, the apparatus 200 may be caused to provision the recommendation to the enterprise to close the first interaction channel. In another example embodiment, the apparatus 200 may be caused to recommend an appropriate channel to the customer or the agent for the interaction to be successful. For example, a recommendation to open a second interaction channel to replace the first interaction channel is provisioned by the apparatus 200 (for example, by using the I/O interface 206) to the customer or the enterprise. In an illustrative example, if the first interaction channel is a noisy voice channel, a recommendation may be sent to the customer to switch to a chat channel and, subsequently, the voice channel may be closed. The decision to close or delete an interaction channel from the customer interaction may also be based on a geographic location change of the user. In some embodiments, the geographic location change is anticipated based on a direction and speed associated with customer when the customer is travelling towards a destination that affords another interaction channel or device. In an embodiment, the geographic location change is anticipated based on a calendar entry. For example, if there is a calendar entry related to a travel plan made by the customer, then the apparatus 200 may be caused to recommend closure of one interaction channel and make a transition to another appropriate interaction channel. In another example, a recommendation to re-open the first interaction channel may also be provisioned to revert the loss of the first interaction channel after the second interaction channel is eventually observed to be less productive than predicted.

In at least one example embodiment, the processor 202 is configured to, with the content of the memory 204, cause the apparatus 200 to provide at least one of a textual prompt and a verbal prompt to a customer to indicate the closure of the first interaction channel. The textual prompt and/or the verbal prompt are provided to the customer prior to effecting the closure of the first interaction channel as exemplarily depicted in FIG. 4A.

Figure 4A:
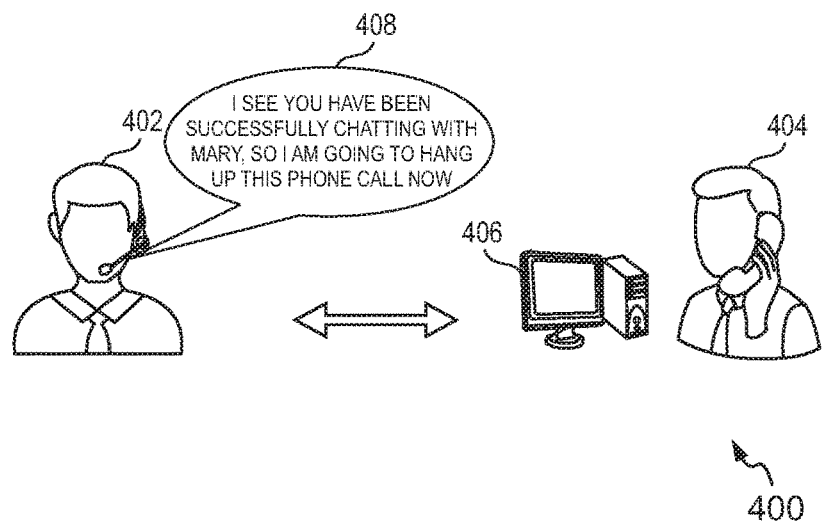
FIG. 4A is a simplified representation showing an agent of an enterprise engaged in an interaction with a customer for illustrating a provisioning of a channel closure experience, in accordance with an embodiment of the invention.

FIG. 4A is a simplified representation 400 showing an agent 402 of an enterprise engaged in an interaction with a customer 404 for illustrating a provisioning of a channel closure experience, in accordance with an embodiment of the invention. In an example scenario, the customer 404 may have initiated a voice call interaction with the agent 402 to seek help in troubleshooting a product. During the course of the ongoing interaction, the customer 402 may have changed his location. The apparatus 200 having detected a change in contextual environment may determine that the customer 404 may have now access to a chat channel over a desktop computer 406. The apparatus 200 may recommend the agent 402 to request the customer 404 if he would like to transition the interaction to a chat channel. Upon receiving a positive response from the customer 404, the interaction may be transitioned to a chat channel. In an illustrative example, the agent 402 may verbally request the customer to access a URL to initiate a chat interaction with an expert (for example, another agent, say Mary). Upon detecting that the customer 404 has been successfully transitioned to another interaction channel, the apparatus 200 may be caused to provision a transition prompt (for example, a verbal transition prompt as exemplarily depicted by 408, or a textual prompt in a chat console) stating for example, "I see you have been successfully chatting with Mary, so I am going to hang up this phone call now", thereby providing a channel closure experience to the customer 404.

Referring now to FIG. 2, in at least one example embodiment, the processor 202 is configured to, with the content of the memory 204, cause the apparatus 200 to provision an intimation informing a customer of the transitioning of the ongoing customer interaction to the second interaction channel after effecting the closure of the first interaction channel. The intimation may be provisioned to the customer prior to effecting the closure of the first interaction channel as exemplarily depicted in FIG. 4B.

Figure 4B:
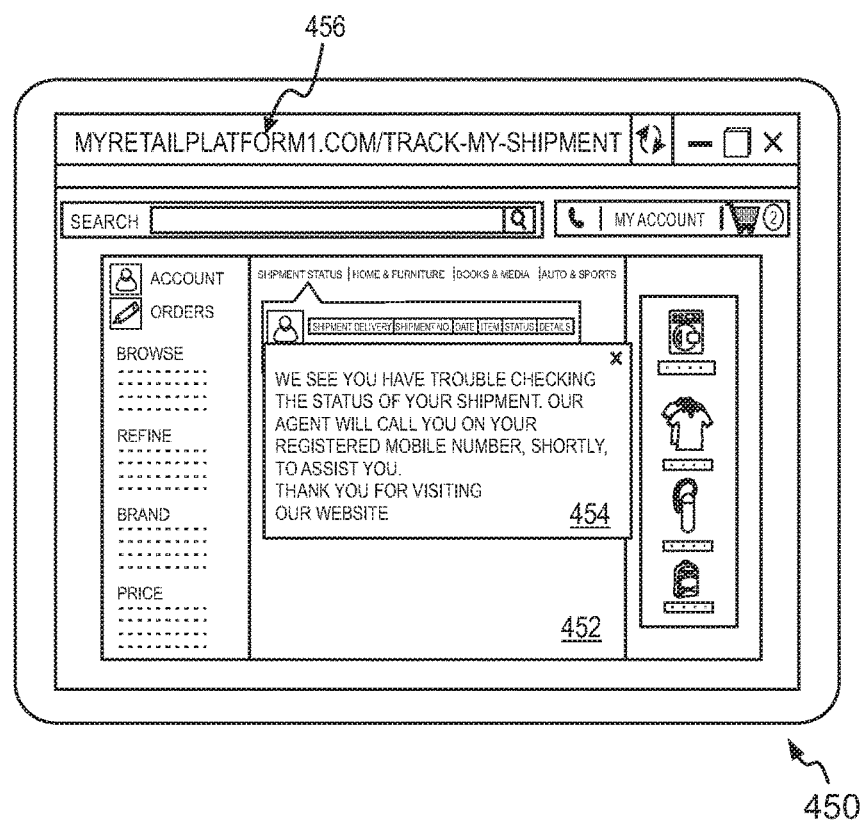
FIG. 4B depicts a simplified representation of a user interface showing intimation displayed to a customer for illustrating a provisioning of a channel closure experience, in accordance with an embodiment of the invention.

FIG. 4B depicts a simplified representation 450 of a user interface 452 showing intimation 454 displayed to a customer for illustrating a provisioning of a channel closure experience, in accordance with an embodiment of the invention. In an illustrative example, the customer (not shown in FIG. 4B) may have accessed an enterprise Website 456, i.e. a Web channel, to check delivery status of a product shipment. The customer may have problem loading the relevant Web page on the enterprise Website 456 on account of slow speed of the connecting network. In such a scenario, the apparatus 200 having detected a current value of the communication quality metric to be below a preset threshold value, may determine the need to transition the interaction to another interaction channel, such as a voice channel. The apparatus 200 may be caused to display the intimation 454, i.e. a textual prompt stating for example, "We see you have trouble checking the status of your shipment. Our agent will call you on your registered mobile number, shortly, to assist you. Thank you for visiting our Website". Thereafter, the Website 456 or the Web interaction may be closed. In some example scenarios, the closure of the Web channel and transitioning of the interaction to voice channel may not overlap (i.e. a Cold transition). In such a scenario, intimation such as the intimation 454 may provide necessary confirmation of the continued interaction to the customer and provide a pleasant channel closure experience to the customer. It is noted that the interaction may also be transitioned to a chat interaction over a different device, wherein a chat console may be opened substantially simultaneously with the closing of the Web channel (i.e. a Hot transition).

Referring now to FIG. 2, in at least one example embodiment, the processor 202 is configured to, with the content of the memory 204, cause the apparatus 200 to predict an intention of a customer associated with the ongoing customer interaction. In an embodiment, the intention of the customer is predicted based on information collated corresponding to an activity of the customer on the first interaction channel. The information collated corresponding to the activity of the customer is also referred to herein as 'journey data'. More specifically, journey data includes information derived from tracking and recording a customer's behavior from the time a customer starts envisioning and taking steps to achieve an intent or goal (both within a single channel of interaction or across channels of interactions) to the time a goal is attained, changed, or abandoned. Journey data can also be collected based on tracking and recording of the customer's experience caused by the intersection of the customer's behavior and the enterprise workflow as well as intersection with the customer's context and physical geographic location. Some examples of the types of journey data that can be collected include Web pages visited, mobile screens touched, work flow steps completed, sequence of steps taken, engagement time, GPS location, motion, IVR speech nodes touched, IVR prompts heard, customer utterances recognized, widgets or screens displayed or accessed, buttons selected or clicked, historical session experience and results, customer relationship management (CRM) state and state changes, agent wrap-up notes, speech recordings/transcripts, chat transcripts, survey feedback, channels touched/used, sequence of channels touched/used, instructions, answers, actions given/performed by either enterprise system or agents for the customer, and the like.

In an embodiment, the decision to delete the first interaction channel is based on dynamic prediction of benefit to the customer and the enterprise. The predictions are made based on (1) the channels that best predict a successful journey for prior interactions; (2) the customer's previously gathered information (customer profile, purchase history, service history, Web journeys, patterns in previous customer behavior, previous approvals made by the customer, etc.); and (3) journey data or current session information (context, current journey, GPS coordinates, device capabilities, etc.).

In an embodiment, for customer intention prediction purposes, the memory 204 stores one or more prediction models (not shown in FIG. 2), which are configured to subject the previously gathered information and the information collated corresponding to an activity of the customer on the first interaction channel to a set of structured and un-structured data analytical models including text mining and predictive models. Examples of the prediction models may include, but are not limited to Logistic regression, Naïve Bayesian, Rule Engines, Neural Networks, Decision Trees, Support Vector Machines, k-nearest neighbor, K-means, and the like. In an embodiment, the prediction models may be configured to extract features from previously gathered information and the current journey data and provision the features to the prediction models. Examples of the features that may be provisioned to the prediction model may include, but are not limited to, any combinations of words features such as n-grams, unigrams, bigrams and trigrams, word phrases, part-of-speech of words, sentiment of words, sentiment of sentences, position of words, customer keyword searches, customer click data, customer Web journeys, cross-channel journeys, call-flow, the customer interaction history, and the like. In an embodiment, the prediction models may use any combination of the above-mentioned input features to predict the customer's likely intention. In some embodiments, the intention can be inferred and or predicted, based on prior or current activity, or can be specifically indicated by the customer. In at least one example embodiment, the apparatus 200 may be caused to evaluate the predicted customer's intention and real time dynamic context to provide guidance and to influence the steps to be performed to delete the first interaction channel presently being used for the customer interaction.

In an embodiment, the prediction models may also be used by the processor 202 to predict the most beneficial type and timing of channel deletion. These predictions can be influenced by the actions of the customer and the objectives of the enterprise. In an embodiment, channel deletion is performed based on metrics, where the metrics are categorized as advantageous, disadvantageous, and neutral. Machine learning and other artificial intelligence (AI) techniques may be used to monitor the predictions and the customer responses to improve the predictions. The predicted channel deletion may be automatically performed for the customer through the customer's interaction device or devices.

In an embodiment, the apparatus 200 may be caused to select an interaction channel as the second interaction channel from among a plurality of interaction channels based on at least one of the predicted intention of the customer and a historical interaction channel preference associated with the customer. For example, if the predicted intention of the customer suggests that the customer will purchase a specific product during the course of the ongoing interaction and the customer has historically preferred Web channel for making transactions, then the second interaction channel chosen for transitioning the ongoing customer interaction may be Web channel.

In an embodiment, the apparatus 200 may be caused to select an interaction channel determined to provide maximum benefit to the customer as the second interaction channel from among a plurality of interaction channels. In an embodiment, an interaction channel determined to meet one or more predefined enterprise objectives is selected as the second interaction channel from among a plurality of interaction channels. Some non-limiting examples of the predefined enterprise objectives may include a sales objective, a service objective, an influence objective and the like. The sales objective may be indicative of a goal of increasing sales revenue of the enterprise. The service objective may be indicative of a motive of improving interaction experience of the customer, whereas the influence objective may be indicative of the motive of influencing a customer into making a purchase.

In at least one example embodiment, the processor 202 is configured to, with the content of the memory 204, cause the apparatus 200 to effect a passing of at least one of an authentication information (for example, information configured to facilitate customer identification and authentication) and an interaction context information (for example, information collated corresponding to the ongoing customer interaction so far) from the first interaction channel to the second interaction channel. In an embodiment, the apparatus 200 is caused to identify and tag the customer and their context, e.g. history, past behavior, steps progressed, obstacles and/or issues encountered, etc., uniquely. In an embodiment, the unique identifiers may be used to create linkages across interaction channels and devices within the same session, as well as across sessions probabilistically based on machine learning and statistical models driven by behavior and other attributes of customer journeys. Examples of various unique identifiers may include, but are not limited to IP address, Web cookies, third party Web cookies, order IDs, request IDs, various personally identifiable information (PII), mobile device identifiers, and the like. The creating, passing, and matching of unique identifiers enables the seamless transfer of context, experience, history, action, information, and identification between the separate interaction channels that customers typically use to engage with enterprises and/or businesses.

The managing of ongoing customer interactions is so far explained with reference to closing of one interaction channel (i.e. the first interaction channel) and adding another interaction channel (i.e. the second interaction channel). However, in some embodiments, the customer interaction may be conducted on more than one interaction channel at once. The managing of ongoing customer interactions is such scenarios is explained hereinafter.

In at least one example embodiment, the processor 202 is configured to, with the content of the memory 204, cause the apparatus 200 to effect an addition of a second interaction channel to an ongoing customer interaction executed on a first interaction channel. The addition of the second interaction channel may be effected to facilitate one or more predefined enterprise objectives, such as the sales objective, service objective, influence objective as explained above.

As explained with reference to FIG. 1, as the customer-to-enterprise interaction progresses, one or more additional interaction channels can be added to facilitate the interaction. In an embodiment, the apparatus 200 may be caused to receive a request for addition of an interaction channel from the customer to the enterprise. In some embodiments, the enterprise may suggest addition of an interaction channel to facilitate the interaction. In such scenarios, an I/O interface 206 may be employed by the enterprise to make the suggestion of the additional interaction channel. For ease of understanding, the initially requested interaction channel is referred to herein as a 'first interaction channel' and the additional interaction channel added to the interaction is referred to herein as a 'second interaction channel'. It is noted that the addition of interaction channels may not be limited to only one additional interaction channel, i.e. the second interaction channel. Indeed, in some example scenarios, two or more interaction channels (for example, a third interaction channel, a fourth interaction channel and so on and so forth) may be added to facilitate the customerto-enterprise interaction and its ongoing, evolving needs as explained with reference to FIG. 3. Further, as explained above, the added interaction channel may be different from the first interaction channel. It is also noted that the second interaction channel may be added on an electronic device different from the electronic device used for conducting the interaction on first interaction channel.

In an illustrative example, the apparatus 200 is caused to supplement or divert a customer call to a linked Web session. The linked Web session may be established by forwarding the corresponding Web links or content to the customer via SMS or email, by asking and/or instructing the customer to visit a personalized Web page, by opening a preconfigured Web page whenever the customer calls a predefined number, by a registered customer device initiating a linked session in response to the request from a customer support representative, or by the customer initiating a session on the customer's device and linking the session. In an embodiment, the Web sessions may be automated as well as agent-guided Web sessions. In an embodiment, the apparatus 200 may authenticate the customer during addition of an interaction channel or where customer is interacting via a device, which can be used by other customers. For example, consider a phone call interaction that contains customer authentication. When a mobile Web experience is added to this existing phone call from/to a Web-enabled mobile phone, authentication may be achieved by virtue of the phone call continuing along with the Web interaction. Further, for security reasons, the mobile Web experience may be limited to only the duration of the call. In some embodiments, where the Web experience is on a different device than the phone, for example desktop or laptop, authentication may be achieved by sending email with a unique Uniform Resource Locator (URL) to the registered email on account for the customer. Alternatively, a unique URL may be provided to the customer on the phone call, which may last only for the duration of the phone call. It is noted that other modes of authentication such as bio-metric data, facial/speech recognition and the like may also be utilized for facilitating such linked interaction sessions without imposing upon the customer, additional steps/effort to authenticate in newly-linked interaction sessions.

In at least one example embodiment, the processor 202 is configured to, with the content of the memory 204, cause the apparatus 200 to track a respective communication quality metric corresponding to each of the first interaction channel and the second interaction channel. More specifically, the apparatus 200 may be caused to track a current value of a first communication quality metric corresponding to the first interaction channel and a current value of a second communication quality metric corresponding to the second interaction channel. The measurement of the communication quality metric and the subsequent tracking of the respective current values for each of the first interaction channel and the second interaction channel is explained with respect to the first interaction channel above and is not explained again herein. It is noted that the second communication quality metric can be the same metric used for the first interaction channel or can be a different metric.

In at least one example embodiment, the processor 202 is configured to, with the content of the memory 204, cause the apparatus 200 to effect a closure of an interaction channel from among the first interaction channel and the second interaction channel based on at least one of (1) a detection of a current value associated with a communication quality metric of the interaction channel to be below a preset threshold value; (2) a detected or an anticipated lack of productivity associated with the interaction channel; and (3) a receipt of a customer request for closing the interaction channel. More specifically, the apparatus 200 may be caused to close one of the first interaction channel and the second interaction channel based on their respective communication quality metrics, productivity and/or explicit request by the customer to close the interaction channel. For example, a current value of the communication quality metric of the first interaction channel may be below a preset threshold value (for example, a value below a rating of 5 on a scale of 1-10, implying below average communication quality). In such a scenario, the apparatus 200 may be caused to close or delete the first interaction channel. It is noted that the deletion of the first interaction channel is described herein for illustration purposes only, and in some scenarios, the second interaction channel may also be deleted based on the various criteria for determining the closure or deletion of interaction channels.

In an embodiment, the decision to close or delete an interaction channel from the customer interaction is based on an observed lack of productivity in the interaction channel relative to other similar interactions by other customers or by this customer in one or more previous interactions. For example, if the customer interaction is being executed on a chat channel and an IVR channel and the chat channel has been idle for a while, the apparatus 200 may be caused to determine the chat channel as unproductive for the interaction purposes and effect closure of the chat channel with associated transition prompts (either in speech/on-screen or both as per current interaction situation). In an embodiment, the apparatus 200 may also determine the interaction channel to be closed or deleted based on a corporate policy associated with customer related enterprise. For example, according to a corporate policy, the customer may not be allowed to interact in, say the chat channel, during office hours. Accordingly, the apparatus 200 may be caused to close or delete a chat interaction channel upon customer entry into the office. In an embodiment, the addition of an interaction channel, the transition to an interaction channel and the deletion of an interaction channel may also be performed based on security concerns.

In an embodiment, the closure of interaction channel may further include a transitioning of the ongoing customer interaction from the interaction channel to a remaining interaction channel from among the first interaction channel and the second interaction channel if the ongoing customer interaction is not being executed on the remaining interaction channel. For example, if among the first interaction channel and the second interaction channel, it is determined that the first interaction channel is to be closed for reasons, such as deteriorating communication quality or explicit customer request etc., and if the interaction is currently being executed on the first interaction channel, then the apparatus 200 may be caused to transition the interaction to the second interaction channel. However, if the interaction is currently being executed on the second interaction channel, then the apparatus 200 may be caused to preclude transitioning of the interaction and directly effect closure of the first interaction channel. An example of seamless transfer of a customer interaction from one interaction channel/device to another interaction channel/device is explained with reference to FIGS. 5A and 5B.

Figure 5A:
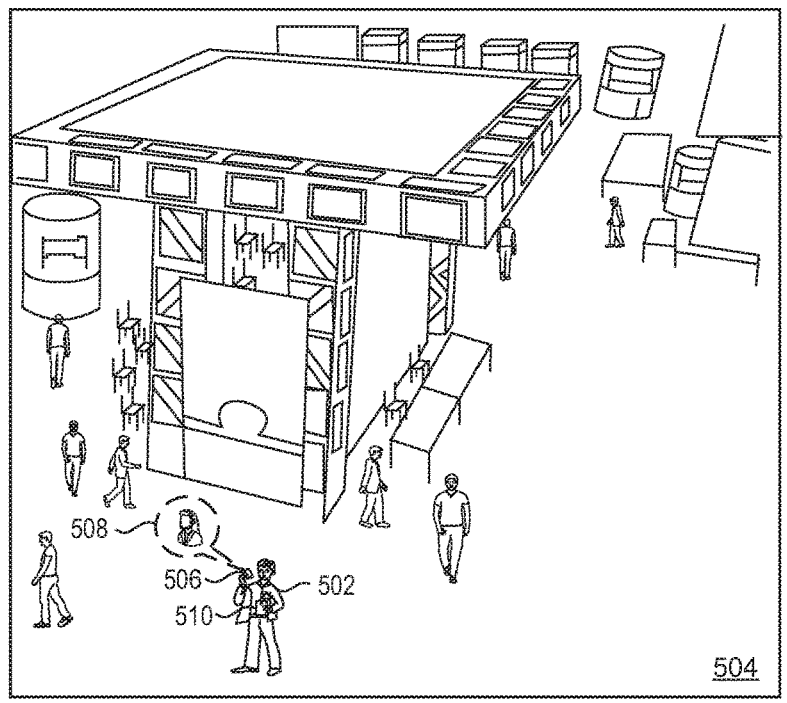
FIGS. 5A and 5B depict an example scenario for illustrating a seamless transfer of a customer interaction from one interaction channel/device to another interaction channel/device, in accordance with an embodiment of the invention.
Figure 5B:
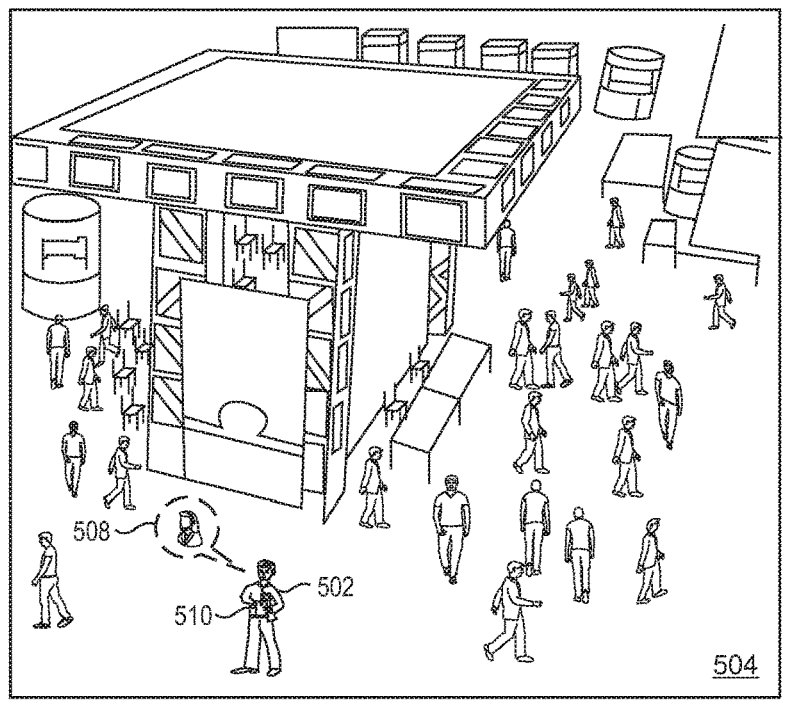

FIGS. 5A and 5B depict an example scenario for illustrating a seamless transfer of a customer interaction from one interaction channel/device to another interaction channel/device, in accordance with an embodiment of the invention. More specifically, FIG. 5A depicts a customer 502, disposed in a public place 504 and using a smartphone 506 to initiate an interaction with a remote agent 508. As, the interaction progresses, the agent 508 recommends opening up a second screen channel on a customer's tablet device 510 to exchange data between the customer 502 and the agent 508 and further the agent 508 sends an email with links to relevant Web pages to the customer 502. The customer 502 adding a Web channel on the tablet device 510 corresponds to adding a second interaction channel to the interaction. With the approach of lunch hour, an immediate environment of the customer 502 becomes busier and an ambient noise in the public place 504 increases. Such a scenario is depicted in FIG. 5B. Accordingly, continuing interaction on the smartphone audio becomes impractical. The agent 508 transitions the focus of interactions exclusively to the tablet device 510, adds a third interactive channel, i.e. a chat channel to enable the customer 502 to either continue with the same agent, i.e. the agent 508, or transition to a new live agent and then deletes the voice channel on the smartphone 506. As shown in FIG. 5B, the customer 502 is depicted to be interacting with the agent 508 exclusively using the tablet device 510. Such addition of interaction channels with subsequent deletion of ineffective channels while taking particular circumstances of the customer 502 and the current interaction into account results is a more efficient exchange between the enterprise and the customer 502 and an improved experience for the customer 502.

A method for managing customer interactions on multiple interaction channels is explained with reference to FIG. 6.

Figure 6:
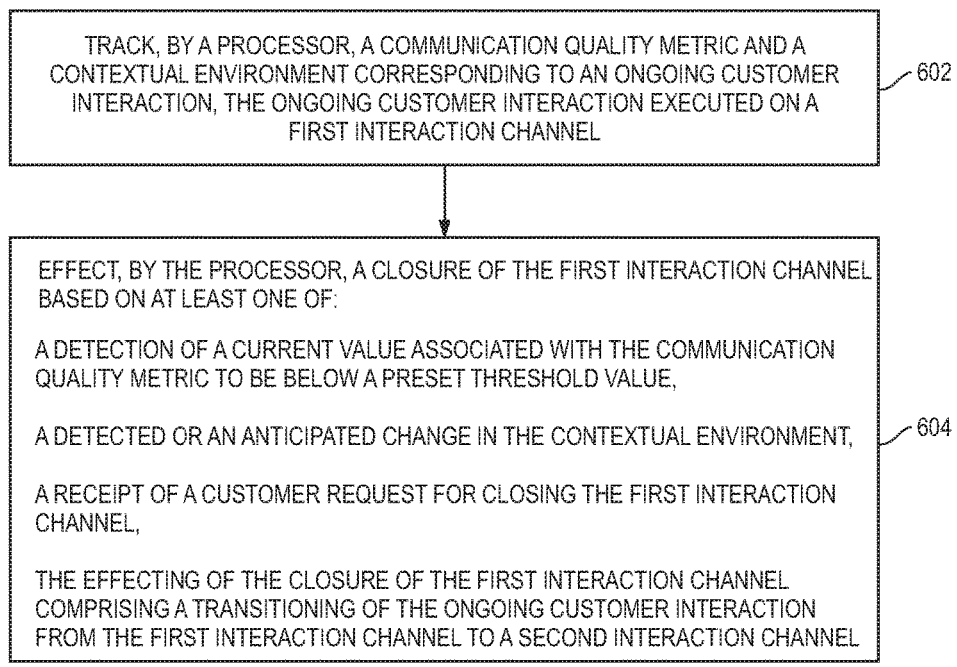
FIG. 6 is a flow diagram of an example method for managing customer interactions on multiple interaction channels, in accordance with an embodiment of the invention.

FIG. 6 is a flow diagram of an example method 600 for managing customer interactions on multiple interaction channels, in accordance with an embodiment of the invention. The method 600 depicted in the flow diagram may be executed by, for example, the apparatus 200 explained with reference to FIGS. 2 to 5B. Operations of the flowchart, and combinations of operation in the flowchart, may be implemented by, for example, hardware, firmware, a processor, circuitry and/or a different device associated with the execution of software that includes one or more computer program instructions. The operations of the method 600 are described herein with help of the apparatus 200. For example, one or more operations corresponding to the method 600 may be executed by a processor, such as the processor 202 of the apparatus 200. It is noted that although the one or more operations are explained herein to be executed by the processor alone, it is understood that the processor is associated with a memory, such as the memory 204 of the apparatus 200, which is configured to store machine executable instructions for facilitating the execution of the one or more operations. It is also noted that, the operations of the method 600 can be described and/or practiced by using a system other than the apparatus 200. The method 600 starts at operation 602.

At operation 602 of the method 600, a communication quality metric and a contextual environment corresponding to an ongoing customer interaction is tracked by a processor, such as the processor 202 of the apparatus 200 of FIG. 2. The ongoing customer interaction is executed on a first interaction channel. Some non-limiting examples of the first interaction channel may include a Web channel, a textual chat channel, a voice channel, an interactive voice response (IVR) channel, a social media channel, a native mobile application channel, an email channel, and the like.

As explained with reference to FIG. 2, the communication quality metric may correspond to a measure indicative of a quality of communication afforded to the ongoing customer interaction by the first interaction channel. At least one of an audio quality, a video quality and a speed of interaction associated with the first interaction channel may be monitored to track the communication quality metric. In at least one example embodiment, the apparatus 200 may be caused to determine a current value of the communication quality metric and thereafter track the current value of the communication quality metric. In at least some example embodiments, the actual measurements of audio quality (in decibels or signal-to-noise ratio measurements), of video quality (in Peak-Signal-to-Noise-Ratio or PSNR measurement or in terms of resolution, such as high definition resolution etc.) or of speed of interaction (in megabytes per second) may be translated into values on a scale of 1 to 10 based on the pre-defined ranges, the measurements fall into. For example, if the customer's speech input cannot be heard and recognized by a speech recognition-based IVR system, then the communication quality metric may be associated with a current value of '1' implying 'Extremely Poor' communication quality. As a current value of the communication quality metric may change or vary during the course of the ongoing customer interaction, the current value of the communication quality metric is tracked throughout the duration of the customer interaction.

In addition to tracking the communication quality metric, the contextual environment associated with the ongoing customer interaction may also be tracked. In at least some example embodiments, tracking of the contextual environment may involve monitoring at least one of a location of a customer associated with the ongoing customer interaction, ambient conditions associated with the location of the customer, a time of the day and a speed of movement associated with the customer. The tracking of the contextual information may be performed as explained with reference to FIG. 2 and is not explained herein.

At operation 604 of the method 600, a closure of the first interaction channel is effected by the processor based on at least one of (1) a detection of a current value associated with the communication quality metric to be below a preset threshold value; (2) a detected or an anticipated change in the contextual environment; and (3) a receipt of a customer request for closing the first interaction channel. In an illustrative example, the current value of communication quality metric for the ongoing customer interaction may be detected to be below a preset threshold value, such as for example a value of '5', which implies an average quality of communication. In such a scenario, the first interaction channel may be determined to be no longer effective for enabling the ongoing customer interaction. In another illustrative scenario, it may be detected that the customer has moved to a location or an environment (for example, noisy environment) that is not conducive to use of the first interaction channel. In such a scenario, the first interaction channel may be determined to be no longer effective for enabling the ongoing customer interaction. In some scenarios, the customer may explicitly express a desire to change the current interaction channel (i.e. the first interaction channel). For example, the customer may wish to transition the current chat interaction from a laptop computer to a voice interaction on a mobile phone as a battery power of the laptop computer is about to be drained completely. Accordingly, for reasons such as deterioration in communication quality metric or change in contextual environment or customer request for change in interaction channel, the closure of the first interaction channel may be effected.

In an embodiment, effecting of the closure of the first interaction channel includes a transitioning of the ongoing customer interaction from the first interaction channel to a second interaction channel. In an embodiment, the second interaction channel corresponds to a different interaction channel than the first interaction channel. For example, the first interaction channel may correspond to a Web channel and the second interaction channel may correspond to a native mobile application channel. However, it is noted that in some embodiments, the second interaction channel may correspond to another instance of same interaction channel on a different device from a device currently being used for facilitating the ongoing customer interaction by the first interaction channel. In an embodiment, the transitioning of the ongoing customer interaction to the second interaction channel is effected on a same device facilitating the ongoing customer interaction using the first interaction channel. For example the first interaction channel may be a chat channel being executed on a mobile phone. The interaction may then be transitioned to a voice interaction on the same mobile phone.

In an embodiment, the transitioning of the ongoing customer interaction to the second interaction channel and the closure of the first interaction channel are effected substantially simultaneously. In an embodiment, the ongoing customer interaction is transitioned to the second interaction channel prior to the closure of the first interaction channel. In an embodiment, the transitioning of the ongoing customer interaction to the second interaction channel is effected subsequent to the closing of the first interaction channel. The seamless transfer of the ongoing customer interaction from one interaction channel/device to another interaction channel/device using 'Warm transition', 'Hot transition' and 'Cold transition' may be performed as explained with reference to FIGS. 2 and 3 and is not explained herein.

In at least some embodiments, a closure/deletion experience may be provided to the customer while deleting an interaction channel, such as the first interaction channel or any of the subsequently added channels. The closure/deletion experience may be associated with one or more of steps, treatments, interactive prompts, visuals, notifications, interaction flow, and the like, for managing and preparing the customer while closing the interaction channel. The provisioning of the closure/deletion experience may be performed as explained with reference to FIGS. 4A and 4B and is not explained herein.

In some embodiments, an intention of a customer associated with the ongoing customer interaction may be predicted based on information collated corresponding to an activity of the customer on the first interaction channel. In at least one example embodiment, the predicted customer's intention and real time dynamic context may be evaluated to provide guidance and to influence the steps to be performed to delete the first interaction channel presently being used for the customer interaction. Further, a passing of at least one of an authentication information and an interaction context information associated with the ongoing customer interaction may be effected from the first interaction channel to the second interaction channel using unique identifiers as explained with reference to FIG. 2.

Another method for managing customer interactions on multiple interaction channels is explained with reference to FIG. 7.

Figure 7:
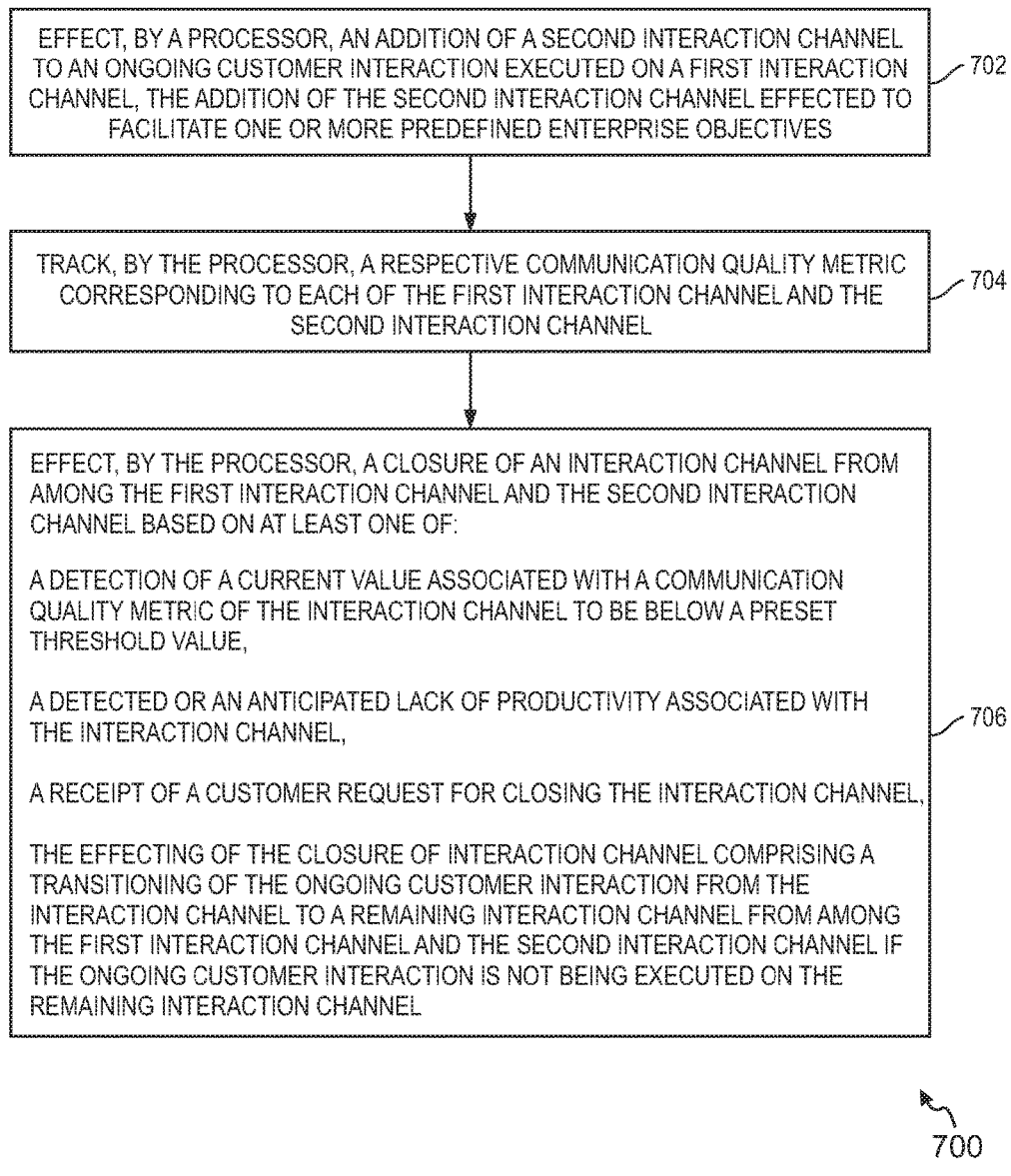
FIG. 7 is a flow diagram of an example method for managing customer interactions on multiple interaction channels, in accordance with another embodiment of the invention.

FIG. 7 is a flow diagram of an example method 700 for managing customer interactions on multiple interaction channels, in accordance with another embodiment of the invention. The method 700 depicted in the flow diagram may be executed by, for example, the apparatus 200 explained with reference to FIGS. 2 to 5B. Operations of the flowchart, and combinations of operation in the flowchart, may be implemented by, for example, hardware, firmware, a processor, circuitry and/or a different device associated with the execution of software that includes one or more computer program instructions. The method 700 starts at operation 702.

At operation 702 of the method 700, an addition of a second interaction channel to an ongoing customer interaction executed on a first interaction channel is effected. The addition of an interaction channel may be performed as explained with reference to FIG. 2. The addition of the second interaction channel is effected to facilitate one or more predefined enterprise objectives. Some non-limiting examples of the predefined enterprise objectives may include a sales objective, a service objective, an influence objective and the like. The sales objective may be indicative of a goal of increasing sales revenue of the enterprise. The service objective may be indicative of a motive of improving interaction experience of the customer, whereas the influence objective may be indicative of the motive of influencing a customer into making a purchase.

At operation 704 of the method 700, a respective communication quality metric corresponding to each of the first interaction channel and the second interaction channel is tracked. For example, a current value of a first communication quality metric corresponding to the first interaction channel and a current value of a second communication quality metric corresponding to the second interaction channel may be tracked.

At operation 706 of the method 700, a closure of an interaction channel from among the first interaction channel and the second interaction channel is effected based on at least one of (1) a detection of a current value associated with a communication quality metric of the interaction channel to be below a preset threshold value; (2) a detected or an anticipated lack of productivity associated with the interaction channel; and (3) a receipt of a customer request for closing the interaction channel. More specifically, the apparatus 200 may be caused to close one of the first interaction channel and the second interaction channel based on their respective communication quality metrics, productivity and/or explicit request by the customer to close the interaction channel.

The effecting of the closure of interaction channel includes a transitioning of the ongoing customer interaction from the interaction channel to a remaining interaction channel from among the first interaction channel and the second interaction channel if the ongoing customer interaction is not being executed on the remaining interaction channel. For example, if among the first interaction channel and the second interaction channel, it is determined that the first interaction channel is to be closed for reasons, such as deteriorating communication quality or explicit customer request etc., and if the interaction is currently being executed on the first interaction channel, then the interaction may be transitioned to the second interaction channel. However, if the interaction is currently being executed on the second interaction channel, then the transitioning of the interaction may be precluded and the closure of the first interaction channel may be effected directly.

Without in any way limiting the scope, interpretation, or application of the claims appearing below, advantages of one or more of the exemplary embodiments disclosed herein enable enterprises to determine 'how' and 'why' an interaction channel should be deleted from an interaction with a customer. As explained above, the benefits of the channel deletion include more effective interaction and better interaction experience for the customer, increased customer focus through reduced cognitive load, conversion of the customer, engagement of the customer, and the like. The determination of the channel deletion is based on a variety of customer contextual parameters including customer information stored on a personal device, in enterprise systems, GPS location, motion/travel, the applications most frequently accessed, mobile screens touched, Websites visited, current location and movement, customer intent/journey, predicted best next action, customer preference, device availability and capability, type of interaction, customer priority/business value, and so on and so forth. Further, the method and apparatus disclosed herein take into account particular circumstances of the customer and the current interaction during transition of channels. For example, an interaction involving an emergency call from a customer where call audio is too weak may be transferred to text communication. Accordingly, method and apparatus disclosed herein facilitate seamless transition of customer interactions over interaction channels and devices while taking into account particular circumstances of the customer and the current interaction, thereby precluding frustrating and unsuccessful interaction experiences for the customers and operating losses for the enterprises.

Various embodiments described above may be implemented in software, hardware, application logic or a combination of software, hardware and application logic. The software, application logic and/or hardware may reside on one or more memory locations, one or more processors, an electronic device or, a computer program product. In an embodiment, the application logic, software or an instruction set is maintained on any one of various conventional computer-readable media. In the context of this document, a "computer-readable medium" may be any media or means that can contain, store, communicate, propagate or transport the instructions for use by or in connection with an instruction execution system, apparatus, or device, as described and depicted in FIG. 2. A computer-readable medium may comprise a computer-readable storage medium that may be any media or means that can contain or store the instructions for use by or in connection with an instruction execution system, apparatus, or device, such as a computer.

Although the present technology has been described with reference to specific exemplary embodiments, it is noted that various modifications and changes may be made to these embodiments without departing from the broad spirit and scope of the present technology. For example, the various operations, blocks, etc., described herein may be enabled and operated using hardware circuitry (for example, complementary metal oxide semiconductor (CMOS) based logic circuitry), firmware, software and/or any combination of hardware, firmware, and/or software (for example, embodied in a machine-readable medium). For example, the apparatuses and methods may be embodied using transistors, logic gates, and electrical circuits (for example, application specific integrated circuit (ASIC) circuitry and/or in Digital Signal Processor (DSP) circuitry).

Particularly, the apparatus 200, the processor 202, the memory 204 and the I/O interfaces 206 may be enabled using software and/or using transistors, logic gates, and electrical circuits (for example, integrated circuit circuitry such as ASIC circuitry). Various embodiments of the present technology may include one or more computer programs stored or otherwise embodied on a computer-readable medium, wherein the computer programs are configured to cause a processor or computer to perform one or more operations (for example, operations explained herein with reference to FIGS. 6 and 7). A computer-readable medium storing, embodying, or encoded with a computer program, or similar language, may be embodied as a tangible data storage device storing one or more software programs that are configured to cause a processor or computer to perform one or more operations. Such operations may be, for example, any of the steps or operations described herein. In some embodiments, the computer programs may be stored and provided to a computer using any type of non-transitory computer readable media. Non-transitory computer readable media include any type of tangible storage media. Examples of non-transitory computer readable media include magnetic storage media (such as floppy disks, magnetic tapes, hard disk drives, etc.), optical magnetic storage media (e.g. magneto-optical disks), CD-ROM (compact disc read only memory), CD-R (compact disc recordable), CD-R/W (compact disc rewritable), DVD (Digital Versatile Disc), BD (Blu-ray (registered trademark) Disc), and semiconductor memories (such as mask ROM, PROM (programmable ROM), EPROM (erasable PROM), flash ROM, RAM (random access memory), etc.). Additionally, a tangible data storage device may be embodied as one or more volatile memory devices, one or more non-volatile memory devices, and/or a combination of one or more volatile memory devices and non-volatile memory devices. In some embodiments, the computer programs may be provided to a computer using any type of transitory computer readable media. Examples of transitory computer readable media include electric signals, optical signals, and electromagnetic waves. Transitory computer readable media can provide the program to a computer via a wired communication line (e.g. electric wires, and optical fibers) or a wireless communication line.

Various embodiments of the present disclosure, as discussed above, may be practiced with steps and/or operations in a different order, and/or with hardware elements in configurations, which are different than those which, are disclosed. Therefore, although the technology has been described based upon these exemplary embodiments, it is noted that certain modifications, variations, and alternative constructions may be apparent and well within the spirit and scope of the technology.

Although various exemplary embodiments of the present technology are described herein in a language specific to structural features and/or methodological acts, the subject matter defined in the appended claims is not necessarily limited to the specific features or acts described above. Rather, the specific features and acts described above are disclosed as exemplary forms of implementing the claims.

The invention claimed is:

1. A computer-implemented method, comprising:
in a communications network capable of executing a set of instructions to effect managing of customer interactions on multiple interaction channels, tracking, by a processor, a communication quality metric and a contextual environment corresponding to an ongoing customer interaction, the ongoing customer interaction executed on a first interaction channel of said multiple interaction channels;
wherein the communication quality metric is a measure indicative of a quality of communication afforded to the ongoing customer interaction by the first interaction channel and, wherein at least one of an audio quality, a video quality, and a speed of interaction associated with the first interaction channel is monitored to facilitate tracking of the communication quality metric; and wherein tracking the contextual environment corresponding to the ongoing customer interaction comprises monitoring at least one of the following:
  a location of a customer associated with the ongoing customer interaction,
  ambient conditions associated with the location of the customer,
  a time of the day, and
  a speed of movement associated with the customer;
effecting, by the processor, a closure of the first interaction channel based on a detection of a current value associated with the communication quality metric to be below a preset threshold value and a detected or an anticipated change in the contextual environment; and
upon effecting of the closure of the first interaction channel, transitioning the ongoing customer interaction from the first interaction channel to a second interaction channel of said multiple interaction channels.

2. The method of claim 1, further comprising:
providing, by the processor, at least one of a textual prompt and a verbal prompt to a customer associated with the ongoing customer interaction, the at least one of the textual prompt and the verbal prompt indicating the closure of the first interaction channel, wherein the at least one of the textual prompt and the verbal prompt is provided to the customer prior to effecting the closure of the first interaction channel.

3. The method of claim 1, wherein the transitioning of the ongoing customer interaction to the second interaction channel and the closure of the first interaction channel are effected simultaneously.

4. The method of claim 1, wherein the ongoing customer interaction is transitioned to the second interaction channel prior to the closure of the first interaction channel.

5. The method of claim 1, wherein the transitioning of the ongoing customer interaction to the second interaction channel is effected subsequent to the closing of the first interaction channel.

6. The method of claim 5, further comprising:
provisioning, by the processor, an intimation informing a customer of the transitioning of the ongoing customer interaction to the second interaction channel, wherein the intimation is provisioned prior to effecting the closure of the first interaction channel.

7. The method of claim 1, wherein the second interaction channel corresponds to a different interaction channel than the first interaction channel.

8. The method of claim 1, wherein the transitioning of the ongoing customer interaction to the second interaction channel is effected on a device facilitating the ongoing customer interaction using the first interaction channel.

9. The method of claim 1, wherein the transitioning of the ongoing customer interaction to the second interaction channel is effected on a different device from a device facilitating the ongoing customer interaction using the first interaction channel.

10. The method of claim 1, further comprising:
predicting, by the processor, an intention of a customer associated with the ongoing customer interaction, the intention of the customer determined based on information collated corresponding to an activity of the customer on the first interaction channel.

11. The method of claim 1, wherein an interaction channel is selected as the second interaction channel from among a plurality of interaction channels based on at least one of the predicted intention of the customer and a historical interaction channel preference associated with the customer.

12. The method of claim 1, wherein an interaction channel determined to meet one or more predefined enterprise objectives is selected as the second interaction channel from among a plurality of interaction channels.

13. The method of claim 1, further comprising:
effecting, by the processor, a passing of at least one of an authentication information and an interaction context information associated with the ongoing customer interaction from the first interaction channel to the second interaction channel.

14. The method of claim 1, wherein each of the first interaction channel and the second interaction channel corresponds to an interaction channel from among a plurality of interaction channels comprising of a Web channel, a chat channel, a voice channel, an interactive voice response channel, a social media channel, a native mobile application channel, an email channel.

15. The method of claim 1, wherein the ongoing customer interaction corresponds to an interaction between a customer of an enterprise and a customer support representative associated with the enterprise.

16. The method of claim 15, wherein the customer support representative is one of a human agent, a virtual agent, and an interactive voice response system.

17. The method of claim 1, wherein the ongoing customer interaction corresponds to an interaction between a customer of an enterprise and one of an enterprise Website and a native mobile application associated with the enterprise.

18. An apparatus, comprising:
a communications network capable of executing a set of instructions to effect managing of customer interactions on multiple interaction channels;
at least one processor; and
a memory having stored therein machine executable instructions, that when executed by the at least one processor, cause the apparatus to:
  track a communication quality metric and a contextual environment corresponding to an ongoing customer interaction, the ongoing customer interaction executed on a first interaction channel of said multiple interaction channels;
  wherein the communication quality metric is a measure indicative of a quality of communication afforded to the ongoing customer interaction by the first interaction channel and, wherein at least one of an audio quality, a video quality, and a speed of interaction associated with the first interaction channel is monitored to facilitate tracking of the communication quality metric; and
  wherein tracking the contextual environment corresponding to the ongoing customer interaction comprises monitoring at least one of the following:
    a location of a customer associated with the ongoing customer interaction,
    ambient conditions associated with the location of the customer,
    a time of the day, and
    a speed of movement associated with the customer;
  effect a closure of the first interaction channel based on a detection of a current value associated with the communication quality metric to be below a preset threshold value and a detected or an anticipated change in the contextual environment; and
  upon effecting of the closure of the first interaction channel, transitioning the ongoing customer interaction from the first interaction channel to a second interaction channel.

19. The apparatus of claim 18, wherein the apparatus is further caused to:
provide at least one of a textual prompt and a verbal prompt to a customer associated with the ongoing customer interaction, the at least one of the textual prompt and the verbal prompt indicating the closure of the first interaction channel, wherein the at least one of the textual prompt and the verbal prompt is provided to the customer prior to effecting the closure of the first interaction channel.

20. The apparatus of claim 18, wherein the transitioning of the ongoing customer interaction to the second interaction channel and the closure of the first interaction channel are effected simultaneously.

21. The apparatus of claim 18, wherein the ongoing customer interaction is transitioned to the second interaction channel prior to the closure of the first interaction channel.

22. The apparatus of claim 18, wherein the transitioning of the ongoing customer interaction to the second interaction channel is effected subsequent to the closing of the first interaction channel.

23. The apparatus of claim 22, wherein the apparatus is further caused to:
provision an intimation informing a customer of the transitioning of the ongoing customer interaction to the second interaction channel, wherein the intimation is provisioned to the customer prior to effecting the closure of the first interaction channel.

24. The apparatus of claim 18, wherein the second interaction channel corresponds to a different interaction channel than the first interaction channel.

25. The apparatus of claim 18, wherein the transitioning of the ongoing customer interaction to the second interaction channel is effected on a device facilitating the ongoing customer interaction using the first interaction channel.

26. The apparatus of claim 18, wherein the transitioning of the ongoing customer interaction to the second interaction channel is effected on a different device from a device facilitating the ongoing customer interaction using the first interaction channel.

27. The apparatus of claim 18, wherein the apparatus is further caused to:
predict an intention of a customer associated with the ongoing customer interaction, the intention of the customer determined based on information collated corresponding to an activity of the customer on the first interaction channel.

28. The apparatus of claim 18, wherein an interaction channel is selected as the second interaction channel from among a plurality of interaction channels based on at least one of the predicted intention of the customer and a historical interaction channel preference associated with the customer.

29. The apparatus of claim 18, wherein the apparatus is further caused to:
effect a passing of at least one of an authentication information and an interaction context information associated with the ongoing customer interaction from the first interaction channel to the second interaction channel.

30. A computer-implemented method, comprising:
in a communications network capable of executing a set of instructions to effect managing of customer interactions on multiple interaction channels, effecting, by a processor, an addition of a second interaction channel to an ongoing customer interaction executed on a first interaction channel, the addition of the second interaction channel effected to facilitate one or more predefined enterprise objectives;
tracking, by the processor, a respective communication quality metric corresponding to each of the first interaction channel and the second interaction channel, wherein the communication quality metric is a measure indicative of a quality of communication afforded to the ongoing customer interaction by the first interaction channel and, wherein at least one of an audio quality, a video quality, and a speed of interaction associated with the first interaction channel is monitored to facilitate tracking of the communication quality metric; and
effecting, by the processor, a closure of an interaction channel from among the first interaction channel and the second interaction channel based on a detection of a current value associated with a communication quality metric of the interaction channel to be below a preset threshold value and a detected or an anticipated lack of productivity associated with the interaction channel; and
upon effecting of the closure of interaction channel, a transitioning the ongoing customer interaction from the interaction channel to a remaining interaction channel from among the first interaction channel and the second interaction channel if the ongoing customer interaction is not being executed on the remaining interaction channel.

31. The method of claim 30, further comprising:
providing, by the processor, at least one of a textual prompt and a verbal prompt to a customer associated with the ongoing customer interaction, the at least one of the textual prompt and the verbal prompt indicating the closure of the interaction channel, wherein the at least one of the textual prompt and the verbal prompt is provided to the customer prior to effecting the closure of the interaction channel.

32. The method of claim 30, wherein the second interaction channel corresponds to a different interaction channel than the first interaction channel.

33. The method of claim 30, wherein the addition of the second interaction channel is effected on a device facilitating the ongoing customer interaction using the first interaction channel.

34. The method of claim 30, wherein the addition of the second interaction channel is effected on a different device from a device facilitating the ongoing customer interaction using the first interaction channel.

35. The method of claim 30, wherein a predefined enterprise objective from among the one or more predefined enterprise objectives is one of a sales objective and a service objective, and wherein the sales objective is indicative of a goal of increasing sales revenue of an enterprise associated with the ongoing customer interaction and the service objective is indicative of a motive of improving interaction experience of the customer.

36. The method of claim 30, further comprising:
predicting, by the processor, an intention of a customer associated with the ongoing customer interaction, the intention of the customer determined based on information collated corresponding to an activity of the customer on the first interaction channel.

37. The method of claim 36, wherein an interaction channel is selected as the second interaction channel from among a plurality of interaction channels based on at least one of the predicted intention of the customer and a historical interaction channel preference associated with the customer.

38. The method of claim 30, further comprising:
    effecting, by the processor, a passing of at least one of an authentication information and an interaction context information associated with the ongoing customer interaction from the first interaction channel to the second interaction channel.

* * * * *